Sept. 2, 1952 A. M. MATTHEWS 2,609,469
SINUSOIDAL POTENTIOMETER
Filed Nov. 19, 1951 4 Sheets-Sheet 1

INVENTOR.
Adrian M. Matthews
BY
Scrivener & Parker

Sept. 2, 1952  A. M. MATTHEWS  2,609,469
SINUSOIDAL POTENTIOMETER
Filed Nov. 19, 1951  4 Sheets-Sheet 2

INVENTOR.
Adrian M. Matthews
BY
Schwener & Parker

Sept. 2, 1952 — A. M. MATTHEWS — 2,609,469
SINUSOIDAL POTENTIOMETER
Filed Nov. 19, 1951 — 4 Sheets-Sheet 3

INVENTOR.
Adrian M. Matthews
BY
Schwener & Parker

Sept. 2, 1952  A. M. MATTHEWS  2,609,469
SINUSOIDAL POTENTIOMETER
Filed Nov. 19, 1951  4 Sheets-Sheet 4

INVENTOR.
Adrian M. Matthews
BY
Leuvener & Parker

Patented Sept. 2, 1952

2,609,469

UNITED STATES PATENT OFFICE 2,609,469

SINUSOIDAL POTENTIOMETER

Adrian M. Matthews, Bristol, Conn.

Application November 19, 1951, Serial No. 257,028

5 Claims. (Cl. 201—48)

1

This invention relates in its broadest aspect to potentiometers and, more particularly, has to do with devices for obtaining from a fixed input voltage output voltages which, respectively, bear a direct relation to the sine and cosine of some angle of movement which is to be measured.

Devices of the type of the present invention depend for their action on the fact that any point P on the periphery of a circle of diameter D which is rotated on its own axis and around the inner periphery of a circle of diameter 2D will move along that diameter of the outer circle which includes the original point of incidence of the point P with the outer fixed circle, while the center of the inner circle moves in the arc of a circle of diameter D whose center coincides with that of the outer circle. The distance between any instantaneous position of the point P and the center of the outer circle will be a function of the sine (or cosine) of the angle of movement of the center of the inner circle from a fixed starting point. This fact is made of use in electrical measuring devices by providing an internal ring gear which forms the outer circle, a gear which meshes with the ring gear and forms the inner circle, a resistance extending along a diameter of the ring gear, and a contact mounted adjacent the periphery of the inner gear and which moves along the resistance. It will be apparent that if current is caused to flow in the resistance the voltage drop between the center of the resistance and the point thereof engaged by the contact will provide a sine (or cosine) function of the amount of angular movement of the inner gear from a starting position. By providing two resistances extending along diameters at right angles to each other and engaged by two contacts positioned at diametrically opposite points on the inner gear it is possible to produce simultaneously both sine and cosine functions.

Potentiometers for simultaneously producing voltages which are, respectively, the function of the sine and cosine of the angle of movement of some control member are known to the prior art and a typical example is disclosed in United States Letters Patent No. 2,507,890 to Crowther. My invention relates to such a device and has for its principal achieved object the provision of such a potentiometer of novel and improved construction, arrangement of parts and mode of operation. For example, one of the principal achieved objects of the invention is the provision of resistance members disposed as diameters of the outer, fixed gear and positioned in the same plane instead of in spaced parallel planes as in

2 prior art devices, whereby the structure and arrangement of parts of the entire potentiometer may be greatly simplified. Another achieved object has been the provision of means to bring the sine and cosine voltages developed at the periphery of the movable inner or epicyclic gear to fixed terminals by means of slip-rings and brushes, whereby positive low-resistance circuits may be provided without introducing excessive friction.

Other achieved objects and features of novelty of my invention will be made apparent by the following description and the annexed drawing disclosing an embodiment of the invention.

Figure 1:
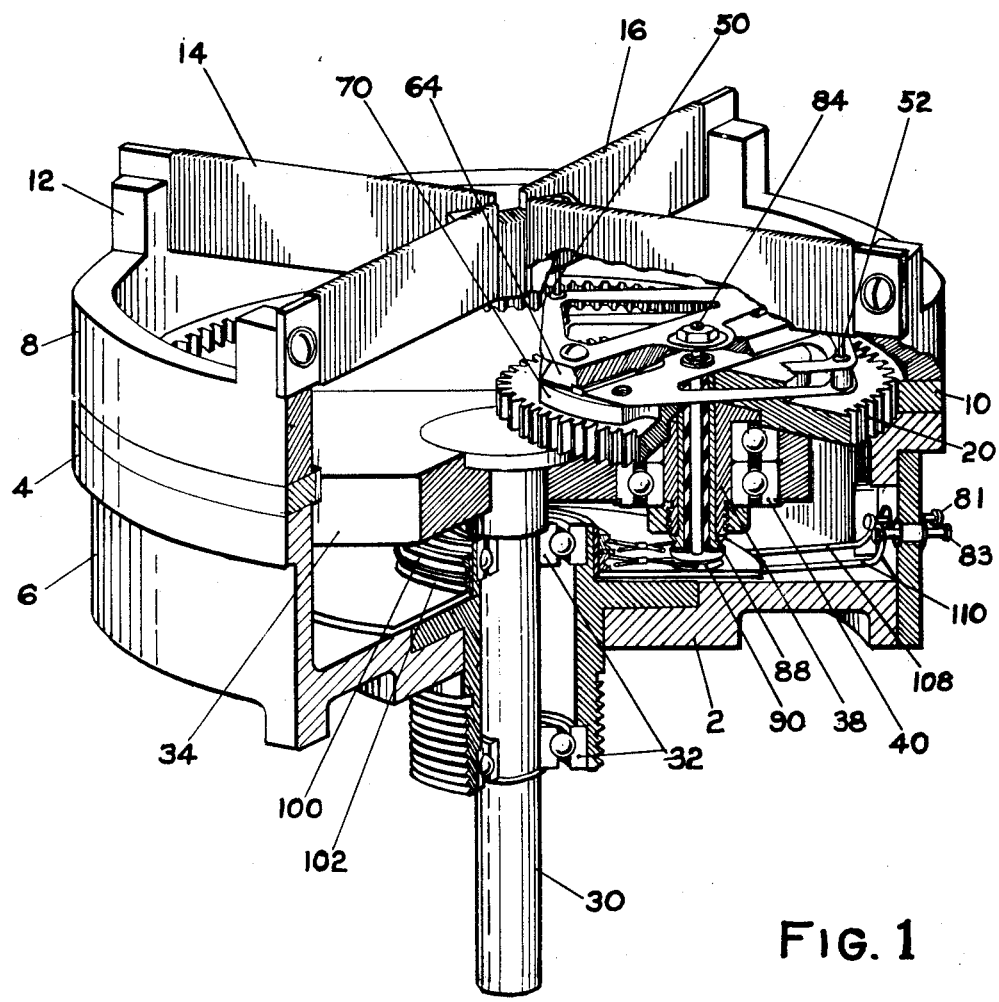
Fig. 1 is a perspective view, with parts broken away, of a potentiometer according to my invention.
Figure 2:
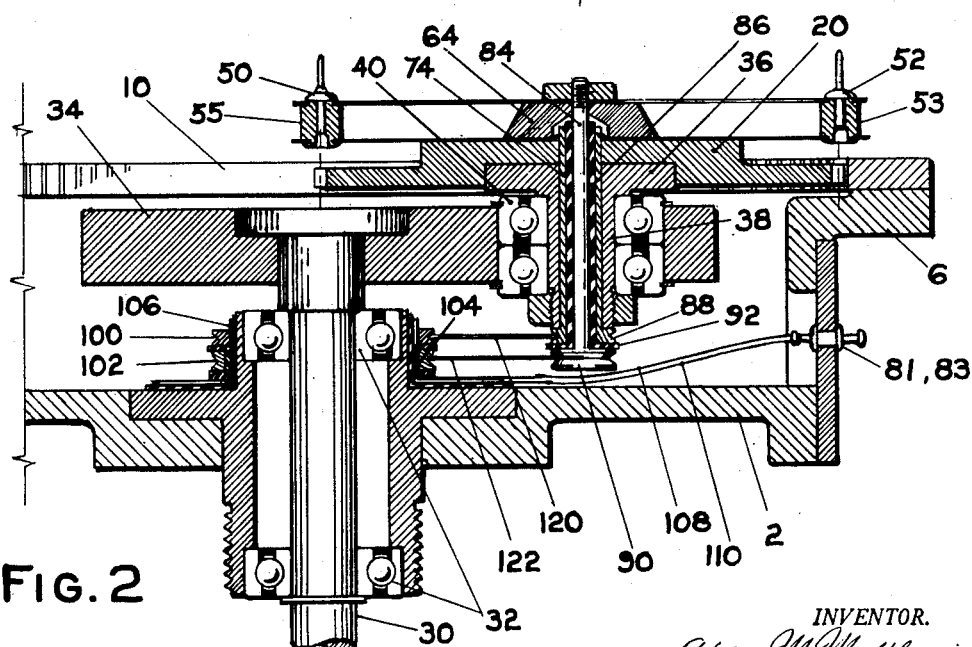
Fig. 2 is a sectional view of a portion of the unit.

An embodiment of the invention is illustrated generally in Figs. 1 and 2 of the drawings, while details thereof are illustrated in the other figures. This embodiment comprises a casing having a bottom 2 and a cylindrical wall 4 which is made up of a lower part 6, an upper part 8 and an intermediate ring gear 10 having internally-facing teeth. Part 8 is constructed of electrically insulating material. Four lugs 12 extend upward from the cylindrical wall of part 8 at the proper intervals to receive the ends of two resistance elements 14, 16 which are disposed at right angles to each other and each of which forms a diameter of the internal ring gear 10. The lower surfaces of the resistance elements are adapted to be engaged by sliding electrical contacts, to be described hereinafter, and are disposed in the same plane, which is parallel to and above that of the ring gear 10.

Within the fixed ring gear 10, and in the same plane, is a second gear 20, having external teeth which mesh with those of the gear 10. The gear diameter of gear 20 is one-half that of gear 10 and it is adapted and intended to be moved about the inner periphery of gear 10, and thus to be rotated about its own center in the usual manner of hypocycloidic gear systems. In structure, the inner gear is upwardly dished at its center, as best shown in Fig. 2. The gear is constructed of electrically insulating material and carries electrical contact means, to be described hereinafter, which engage the lower surfaces of the resistance elements 14, 16 as stated above.

Means are provided by the invention for supporting the inner gear 20 and moving it about the inner periphery of the ring gear 10. Such means comprise a rotatable shaft 30 which extends through the bottom wall 2 of the casing at right angles thereto and is supported for rotation about its own axis by means of suitable bearings 32. At its upper end within the casing the shaft has rigidly fixed thereto a crank-arm 34, which rotatably supports the inner gear 20 in the manner and position described above. The gear is supported on the crank-arm through the medium of a member of T-shaped cross-section, the circular head 36 of which is tightly and fixedly received in the central upwardly dished part of the gear 20 and the shank 38 of which extends downwardly through an aperture in the crank-arm and is supported therein by ball bearings 40 which permit rotation of gear 20 and attached parts. It will be apparent that as the shaft 30 is rotated or adjusted about its axis it will carry the inner gear 20 with it and that gear will accordingly travel about the inner periphery of the ring gear 10 and will rotate about its own axis.

Figure 3:
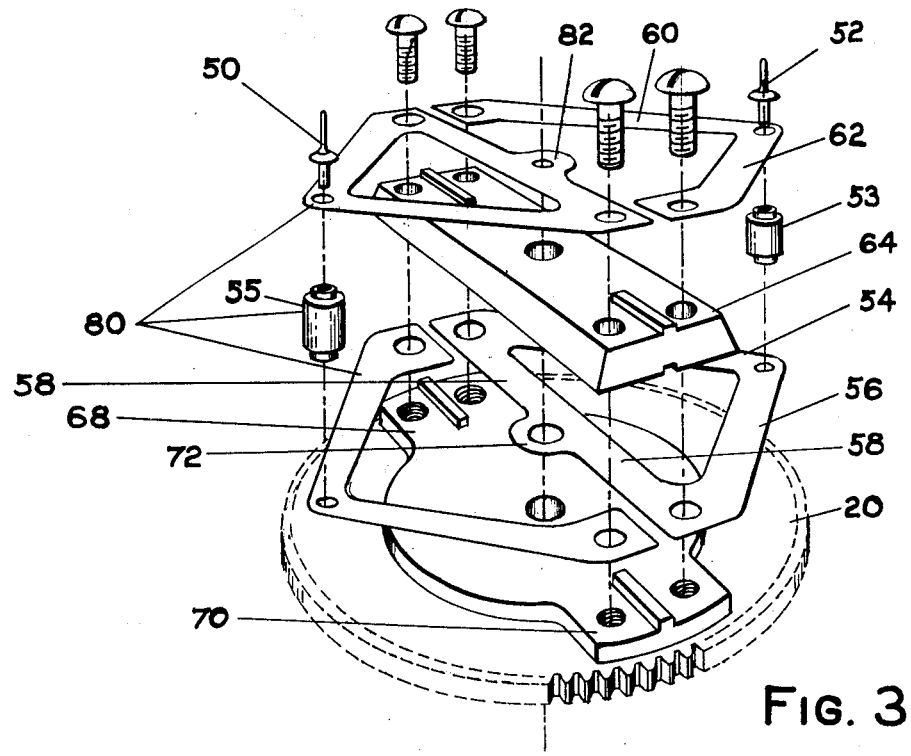
Fig. 3 is an expanded perspective view showing the means provided by the invention for supporting the contact points on the inner gear.

Means provided by the invention, and constructed and arranged in accordance therewith, are provided for contacting the lower coplanar surfaces of the resistance elements 14, 16. Such means comprise contacts 50, 52 which are supported above the upper surface of the inner gear 20 at diametrically opposite points in a circle of equal diameter and concentric with the pitch circle of the inner gear 20 and, being supported by resilient members, are free to move slightly in a direction parallel to the axis of gear 20, but otherwise are rigidly restrained to move therewith. The spring action of the supporting members causes the contacts 50, 52 to remain in contact with the lower surfaces of the resistance elements 16, 14, respectively. The contact 52 is supported at the apex of a triangular reed-like frame which is most clearly illustrated in Fig. 3. This frame comprises a lower, three-sided, triangular part having arms 54, 56, 58 and an upper part having two arms 60, 62 which are arranged in V-shape and, respectively, overlie the arms 54, 56. The contact member 52 is mounted on a cylindrical connecting member 53 supported at the intersection of arms 60, 62 of the upper part and arms 54, 56 of the lower part of the frame and serves to connect contact 52 to the lower frame member. The free end of arms 60, 62 are formed with holes registering with holes in the lower frame part to receive screws which attach the frame assembly to raised bosses 68, 70 on the upper surface of the inner gear 20 outside the central dished part thereof. Block 64 of insulating material is mounted between the upper and lower frame members, the screws previously mentioned extending through the three members. The arms 54, 56, 60 and 62 are stiffened at their central portions causing the reed-like members to bend only at points adjacent to block 64 and connecting members 53, 55 simulating the action of hinges at these points. This assembly gives the contact member 52 freedom to move vertically while restraining it in all other directions. The proportions of the arms 54, 56 and 60, 62 are such that the point of contact 52 follows a vertical path which is very nearly a straight line so that reasonable inaccuracies in the vertical positioning of various parts of the instrument will cause no apparent variation of the distance from the point of contact to the axis of rotation of gear 20. The arm 58 of the lower frame part has an enlargement 72 adjacent its midpoint having a hole therein which, as illustrated in Fig. 3 surrounds and is in electrical contact with a sleeve 74 formed of conductive material and which will be described hereinafter. The contact 50 is supported at the apex of a second frame 80 which is similar to that just described except that the upper and lower parts are in reversed position so that in frame 80 the upper part has three arms and the lower part has two arms. This second frame is mounted on the upper surface of inner gear 20 in the same manner as the first frame and is so positioned thereon that the contacts 50, 52 are located above diametrically opposed points on the gear circle. The enlargement 82 on the upper part of frame member 80 has an opening therein which receives a rod 84, which will be described hereinafter, in such a way that the contact 50 is in electrical contact with the rod. It will be seen from the foregoing description that contacts 50, 52, which are respectively in sliding contact with the resistance wires on the lower surfaces of the resistance elements 16, 14 are rigidly supported at diametrically opposite points of the gear 20 and are, respectively, in electrical contact with the rod 84 and the cylindrical member 74.

Means are provided by the invention for transmitting voltages impressed on the respective movable contacts 50, 52 to fixed terminals 80, 82 mounted on the casing of the device. As described above, the gear 20 is mounted on the crank-arm 34 by means of a T-shaped member, having a head 36 and shank 38. This member is, of course, concentric with gear 20 and the two have an axial bore therethrough, which tightly receives, and is lined by the sleeve or cylinder 74 which is in electrical conducting relation to contact 52. This sleeve or cylinder tightly receives a tube 86 formed of insulating material and the central bore of which tightly receives the rod 84 which is in electrical conducting relation to contact 50. At its lower end the cylinder 74 carries a grooved wheel 88 and at its lower end the rod 84 carries a grooved wheel 90 which is under the wheel 88 and separated therefrom by insulating material 92.

Figure 7:
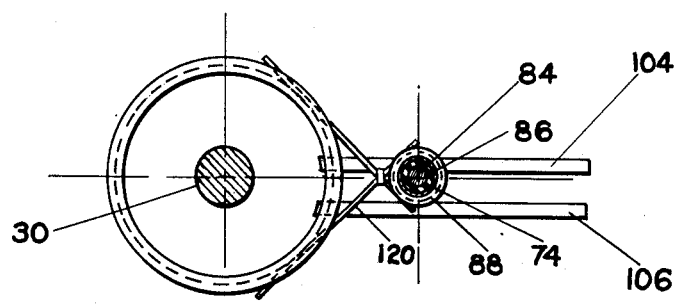
Fig. 7 is a top view.
Figure 8:
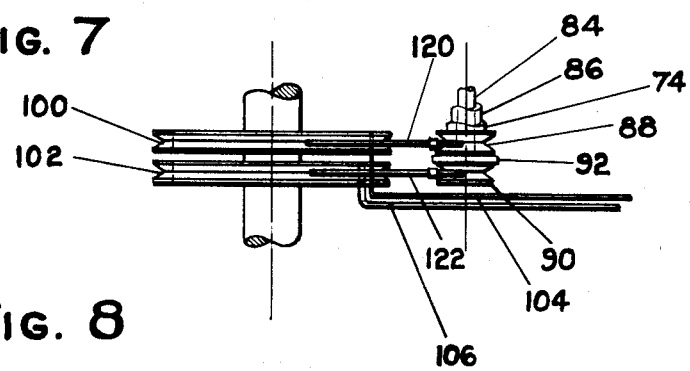
Fig. 8 is a side view of the slip-ring means provided by the invention for connecting the movable contact points to fixed terminals.
Figure 9:
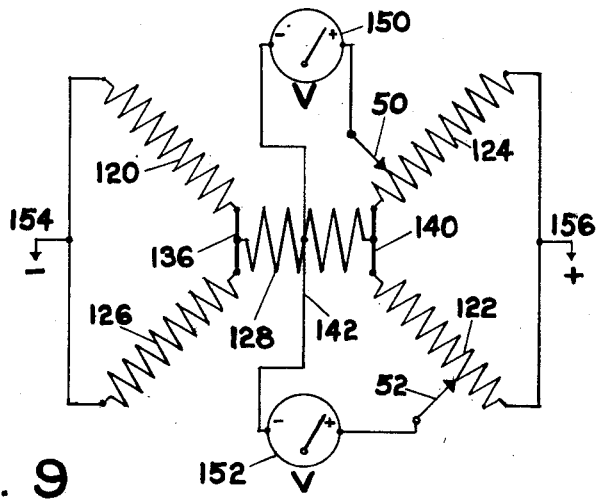
Fig. 9 is a circuit diagram of the electrical elements of the device.

As illustrated in Fig. 3 the bottom 2 of the casing has a central bushing through which the shaft 30 extends and which supports the bearing 32. This bushing has an upper cylindrical part within the casing which is adjacent and at one side of the contact wheels 88, 90. Two grooved rings 100, 102 surround this bushing part and are respectively opposite and at the levels of the wheels 88, 90. These rings are separated from each other and from the bushing part by insulating means and are respectively electrically connected to contact strips 104, 106 which are, in turn, connected to fixed terminals 80, 82 by leads 108, 110. Ring 100 and wheel 88 are electrically connected by a device 120 of X-shape, the adjacent arms of which on one side of the intersection thereof bear resiliently on the wheel 100 and on the other side of the intersection thereof bear resiliently on the ring 100. A similar device 122 electrically connects ring 102 and wheel 90, all as shown in Figs. 7 and 8.

It will be seen from the foregoing description that contact 50, which engages resistance element 16, is electrically connected to fixed terminal 80 through frame member 80, rod 84, wheel 90, wire contact member 122, ring 102, contact strip 104 and lead 110. Contact 52, which engages resistance element 14, is electrically connected to fixed terminal 82 through frame part 54, 56, 58, cylinder 74, wheel 88, contact member 120, ring 100, contact strip 106 and lead 108.

Figure 4:
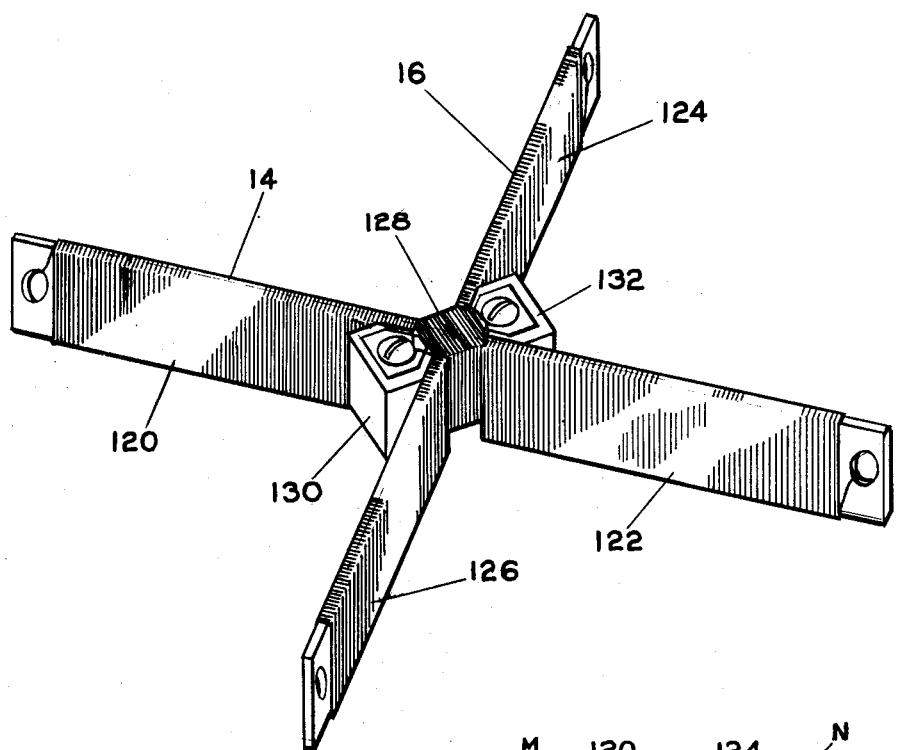
Fig. 4 is a perspective view of the assembly of resistance elements and center block, being shown in inverted position relative to Figs. 1 and 2.
Figure 5:
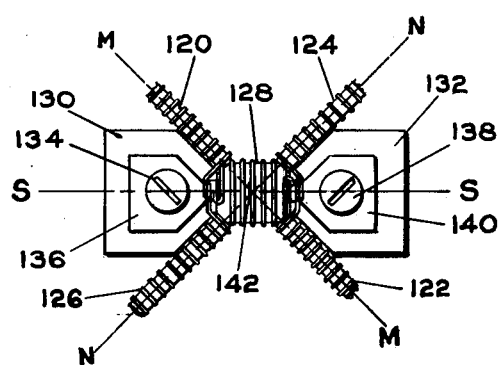
Fig. 5 is a top view.
Figure 6:
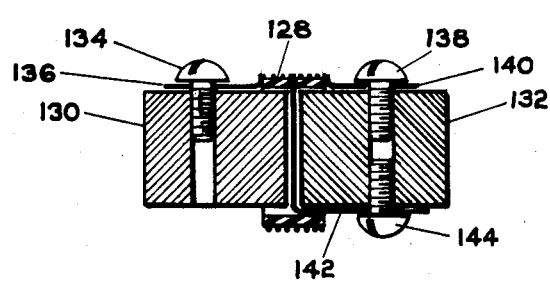
Fig. 6 is a sectional side view, of the center part of the assembly shown in Fig. 4, being shown in a position similar to Fig. 4, but rotated to correspond to Fig. 9.

The cross-shaped resistance device formed by resistance elements 14, 16 is of special and peculiar construction and arrangement provided by this invention. This device is particularly illustrated in Figs. 4, 5 and 6 of the drawings and comprises four separate arms 120, 122, 124, 126 and an assembly which connects and supports the four arms. The four arms are uniformly wound with resistance wire to produce linear and equal resistances. The center assembly comprises a square center portion 128 which is also wire wound and disposed between the adjacent ends of the four arms in such a way that the end of each arm abuts one corner of the winding thereof; and also comprises two blocks 130 and 132 of electrically insulating material which are respectively disposed between adjacent arms 120, 126 and 122, 124 as shown in Fig. 5, and are shaped to be received between the adjacent arms and attached thereto to support the arms. The center block 128 is also supported between the blocks 130, 132. The resistance wire winding on this section is so proportioned that the linearity of the resistance between the outer end of each arm and the center point of the center unit is maintained along the paths traversed by the contacts 50 and 52. These paths are indicated M—M and N—N on Fig. 5. The inner end of the winding on each of arms 120, 126 is connected to a terminal screw 134 on block 130 which, in turn, is connected to one end of the winding on center block 128 by lead strip 136. The winding on each of arms 122, 124 is connected to a terminal screw 138 on block 132 which, in turn, is connected to the other end of the winding on the center block by lead 140. The center point of the winding on the center block is connected by lead 142, which extends through the center block, to a terminal screw 144 on the lower side of block 132 which, in turn, is connected to one terminal of each of two volt-meters or other voltage sensing devices, 150, 152, the other terminals of which are connected, respectively, to the contacts 50, 52 through fixed terminals 80, 82.

The ends of the resistance elements 14, 16 are respectively connected to the terminals 154, 156 of a source of direct current whereby the same voltage drop will appear between the terminals of each resistance element. These elements are preferably mounted in a structure, which is not shown in the drawings, which provides a cover for the entire device.

A typical use of the descirbed device would be in some form of computing device where the problem solution requires the use of a voltage or voltages proportioned to the sine and/or cosine of an angle of movement of some shaft or other device whose motion can be translated into a rotational movement of shaft 30 of this device. Any such angular movement produces similar and equal movement of crank-arm 34 and all of the parts connected thereto, except the epicyclic gear 20 which by reason of its contact with the inner periphery of the fixed ring gear 10 is caused to rotate about its own axis in a direction opposite to that of shaft 30 and arm 34. Because of the relation of the diameters of the two gears the contacts 50, 52 which are carried by the gear 20 will move, respectively, along resistance elements 16, 14 and at any instant their respective positions with respect to the center point 142 of the winding of the center block 128 will be a function of the cosine and sine of the angular position of the shaft from a starting position, in which contact 52 is at one end of resistance element 14 and contact 50 is at the center point 142. At any such instant the voltage detecting circuit including contact 52 will be from the positive input terminal 154 of resistance 14, through the winding on arm 122, contact 52, voltmeter 152, center point 142 and the winding on arm 120 to the negative terminal 156. The circuit through contact 50 will be similar and will include the resistance element 16 and voltmeter 150.

As the crank-arm 34 and gear 20 move with the shaft 30 the means associated therewith for providing electrical connection, including the grooved wheels 88, 90, will move with them. As these wheels move about the fixed rings 100, 102 they carry with them the wire connectors, 120, 122 and thus maintain electrical connection with the rings 100, 102.

While I have described and illustrated one embodiment which my invention may take, it will be apparent to those skilled in the art to which the invention pertains that other embodiments, as well as modifications of that disclosed, may be made without departing in any way from the spirit and scope of the invention, for the limits of which reference must be had to the appended claims.

What is claimed is:

1. An apparatus for deriving voltages which are respectively proportional to the sine and cosine of the angular movement of a shaft or other part, comprising a fixed internal ring gear, a planetary gear meshing with the internal ring gear and having a gear diameter equal to one-half that of the ring gear, a rotatable shaft concentric with the ring gear, a crank arm on said shaft supporting the planetary gear for rotation about its own center whereby angular movement of the shaft causes the planetary gear to travel about the ring gear, and rotate about its own axis, two co-planar linear resistance elements arranged at right angles to each other and each extending diametrically across the ring gear above and adjacent the planetary gear, two contact members mounted on the planetary gear at diametrically opposed points thereof and being respectively in sliding engagement with the resistance elements, means for causing equal current flow in said resistance elements, and means responsive to the voltage drop between the center point of each resistance element and the contact in engagement therewith.

2. An apparatus according to claim 1, in which each resistance element comprises two aligned wire-wound bars and a wire-wound block disposed between them and having the ends of the winding thereon respectively connected to the ends of the windings at the adjacent ends of the bars.

3. An apparatus for deriving voltages which are respectively proportional to the sine and cosine of the angular movement of a shaft or other part, comprising a fixed internal ring gear, a planetary gear meshing with the internal ring gear and having a gear diameter equal to one-half that of the ring gear, a rotatable shaft concentric with the ring gear, a crank arm on said shaft supporting the planetary gear for rotation about its own center whereby angular movement of the shaft causes the planetary gear to travel about the ring gear and rotate about its own axis, two co-planar linear resistance elements arranged at right angles to each other and each extending diametrically across the ring gear above and adjacent the planetary gear and each comprising two aligned wire-wound bars and a wire-wound block disposed between them and having the ends of the winding thereon respectively connected to the ends of the winding at the adjacent ends of the bars, two contact members mounted on the planetary gear at diametrically opposed points thereof and being respectively in sliding engagement with the resistance elements, means for causing equal current flow in each of said resistance elements, and two circuits each including the midpoint of the winding on said block and one of said contacts and indicating means.

4. An apparatus for deriving voltages which are respectively proportional to the sine and cosine of the angular movement of a shaft or other part, comprising a fixed internal ring gear, a planetary gear meshing with the internal ring gear and having a gear diameter equal to one-half that of the ring gear, a rotatable shaft concentric with the ring gear, two fixed rings surrounding said shaft, a crank arm on said shaft supporting the planetary gear for rotation about its own center whereby angular movement of the shaft causes the planetary gear to rotate about its own axis and travel about the ring gear, two co-planar linear resistance elements arranged at right angles to each other and each extending diametrically across the ring gear above and adjacent the planetary gear and each comprising two aligned wire-wound bars and a wire-wound block disposed between them and having the ends of the winding thereon respectively connected to the ends of the windings at the adjacent ends of the bars, two contact members mounted on the planetary gear at diametrically opposed points thereof and being respectively in sliding engagement with the resistance elements, means including slip rings for electrically connecting said contact members to said fixed rings, means for causing equal current flow in each of said resistance elements, and two circuits each including the midpoint of the winding on said block and one of said contacts and indicating means.

5. An apparatus according to claim 1, in which the two contact members are rigidly connected to the upper surface of the planetary gear by electrically insulating means.

ADRIAN M. MATTHEWS.

REFERENCES CITED

The following references are of record in the file of this patent:

UNITED STATES PATENTS

| Number | Name | Date |
|---|---|---|
| 2,507,890 | Crowther | May 16, 1950 |